United States Patent
Kang

[11] Patent Number: 5,887,123
[45] Date of Patent: Mar. 23, 1999

[54] VIDEO CONTROLLER AND VIDEO CONTROL METHOD FOR CHOPPING AND SHRINKING DATA

[75] Inventor: Jung-Sun Kang, Seoul, Rep. of Korea

[73] Assignee: Samsung Electronics Co., Ltd., Kyungki-Do, Rep. of Korea

[21] Appl. No.: 707,447

[22] Filed: Sep. 3, 1996

[30] Foreign Application Priority Data

Aug. 31, 1995 [KR] Rep. of Korea .................. 1995 28397

[51] Int. Cl.[6] .............................. G06F 15/00; H04N 1/40; G09G 5/00; G09G 5/26
[52] U.S. Cl. ......................... 395/109; 395/107; 358/447; 358/448; 358/452; 345/112; 345/127; 345/130
[58] Field of Search ...................... 395/107, 109, 395/112; 347/225, 119, 135; 345/112, 118, 127, 129, 130; 382/177, 298; 348/573; 358/447, 448, 452

[56] References Cited

U.S. PATENT DOCUMENTS 4,148,066 4/1979 Saylor ...................................... 358/261
4,163,260 7/1979 Hisao et al. ............................. 358/261

*Primary Examiner*—Edward L. Coles
*Assistant Examiner*—Mark Wallerson
*Attorney, Agent, or Firm*—Sughrue, Mion, Zinn, Macpeak & Seas, PLLC

[57] ABSTRACT

A video controller and related method for controlling a manner in which input data is printed is provided. Specifically, the controller contains a first AND gate, a buffer, a second AND gate, a third AND gate, and a bus holder. The first AND gate inputs the input data and a chopping control signal and outputs a corresponding chopping output signal. The buffer inputs delayed input data and a buffer control signal. The delayed input data corresponds to the input data which has been delayed for a predetermined period of time, and the buffer outputs the delayed input data as a shrinking control signal in accordance with the buffer control signal. The second AND gate inputs the shrinking control signal and the input data and outputs a corresponding shrinking output signal. The third AND gate inputs the chopping output signal and the shrinking output signal and outputs corresponding output data. Finally, the bus holder maintains an output state of the buffer at an appropriate level.

19 Claims, 2 Drawing Sheets

VIDEO CONTROLLER AND VIDEO CONTROL METHOD FOR CHOPPING AND SHRINKING DATA

RELATED APPLICATIONS

The present application is based on Korean Patent Application No. 28397/1995 which is incorporated herein by reference for all purposes.

FIELD OF THE INVENTION

The present invention relates to a video controller which can be used in a printer for printing data. More particularly, the present invention relates to a video controller which is able to perform chopping and shrinking operations on the data. Furthermore, the present invention relates to a method for performing chopping and shrinking operations.

BACKGROUND OF THE INVENTION

In order to reproduce video data (e.g. graphic data or text data) on a tangible medium, the data may be printed via a laser printer. Furthermore, the video data may be subjected to two types of operations in order to prepare the data to be printed. Specifically, the data may be subjected to a chopping operation and a shrinking operation.

The chopping operation is used to determine whether or not a portion (e.g. a bit) of data is divided into several sections of data. As a result, the chopping operation may generate a segment of data corresponding to each of the sections. The shrinking operation is used to determine whether or not a portion (e.g. a bit) of data is shrunk and the degree to which such data is shrunk.

Furthermore, a register may be provided to store data or other information to control the chopping and shrinking operations. For example, when the bit of data is divided in accordance with the chopping operation, the bit may be divided into sections based on a bit number stored in the register. In particular, each bit of a predetermined number of bits in the register may represent an enabling state of a related section of the data signal.

However, a conventional video controller which performs chopping and shrinking operations has several disadvantages. For instance, such controller is only capable of performing either the chopping operation or the shrinking operation at any given time. As a result, the chopping operation and the shrinking operation cannot be simultaneously performed, and thus, the video controller cannot efficiently process the video data.

SUMMARY OF THE INVENTION

In order to overcome the disadvantages of the conventional video controller, one object of the present invention is to provide a video controller which is capable of simultaneously performing chopping and shrinking operations.

In order to accomplish the above object, a video controller which prints input video data is provided. In particular, the video controller comprises: a first AND gate which inputs said input data and a chopping control signal and which outputs a chopping output signal based on said input data and said chopping control signal; a buffer which inputs a delayed input data and a buffer control signal, wherein said delayed input data corresponds to a said input data which has be delayed for a predetermined period of time and wherein said buffer outputs said delayed input data as a shrinking control signal in accordance with said buffer control signal; and a second AND gate which inputs said shrinking control signal and said input data and which outputs a shrinking output signal based on said input data and said shrinking control signal.

Also, the video controller may further comprise a third AND gate which inputs said chopping output signal and said shrinking output signal and which outputs output data based on said chopping output signal and said shrinking output signal.

Moreover, the video controller may further comprise a bus holder for maintaining an output state of said buffer at an appropriate level.

Also, in order to accomplish the above object of the present invention, a controlling method that may be performed by the video controller is provided.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would be known to one skilled in the art are omitted for the sake of clarity and brevity.

Figure 1:
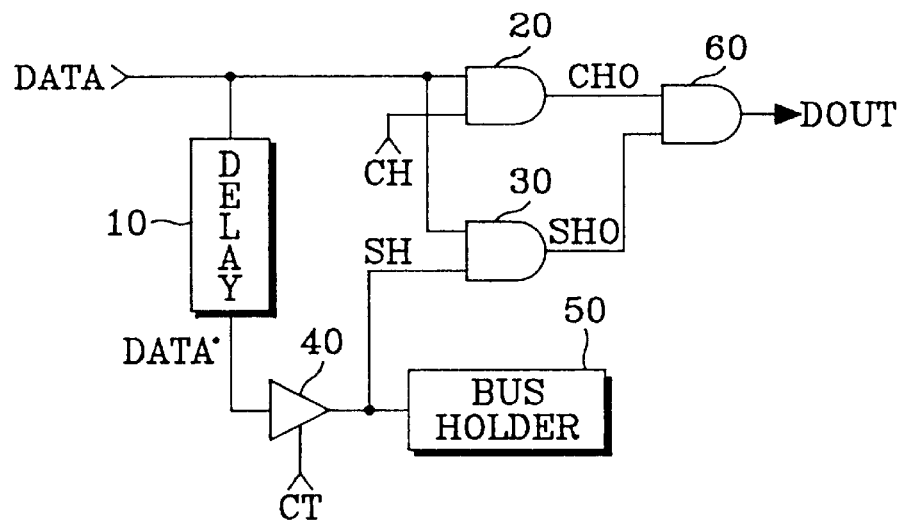
FIG. 1 is a video controller in accordance with one embodiment of the present invention.

FIG. 1 shows an illustrative embodiment of a video controller capable of performing a chopping operation and a shrinking operation. Specifically, the video controller comprises a delay 10, a first AND gate 20, a second AND gate 30, a tri-state buffer 40, a bus holder 50, and a third AND gate 60.

The delay 10 inputs an input data signal DATA, delays the data signal DATA by a predetermined period of time, and outputs a corresponding delayed data signal DATA°. The tri-state buffer 40 inputs the delayed data signal DATA° and a buffer control signal CT. Then, the buffer 40 outputs the signal DATA° as a shrinking control signal SH based on the control signal CT. In addition, the bus holder 50 inputs the control signal SH and maintains the output state of the tri-state buffer 40 at an appropriate level.

The first AND gate 20 inputs the input data signal DATA via a first input terminal and a chopping control signal CH via a second input terminal. Then, the AND gate 20 performs an AND operation on the input signals DATA and CH and outputs a corresponding chopping output signal CHO.

The second AND gate 30 inputs the input data signal DATA via a first input terminal and the shrinking control signal SH via a second input terminal. Subsequently, the AND gate 30 performs an AND operation on the input signals DATA and SH and outputs a shrinking output signal SHO based on the signals DATA and SH.

The AND gate 60 inputs the chopping output signal CHO via a first input terminal and the shrinking output signal SHO via a second input terminal. Then, the AND gate 60 performs an AND operation on the input signals CHO and SHO and outputs a corresponding data output signal DOUT.

Examples of the shrinking and chopping operations performed by the video controller shown in FIG. 1 will be described below. Furthermore, when the input data signal DATA is continuously in the same state (e.g. continuously has the same value) for a certain period of time, the effect of the shrinking operation may only be performed on the initial portion of the data signal DATA.

In addition, the data signal DATA may assumed to be divided into N sections (N being a natural number), and registers may be provided which each have N bit positions that correspond to the chopping and/or shrinking operation. One register (e.g. a shrinking control register) may have N bit positions which store N bits of data that are used to respectively control the shrinking operation of the N sections of the data signal DATA. For example, the bits in such register may be used to generate the buffer control signal CT which is output to the tri-state buffer 40. Similarly, another register (e.g. a chopping control register) may have N bit positions which store N bits of data that are used to respectively control the chopping operation of the N sections of the data signal DATA. For instance, the bits in such register may be used to generate the chopping control signal CH which is input to the first AND gate 20.

Figure 2:
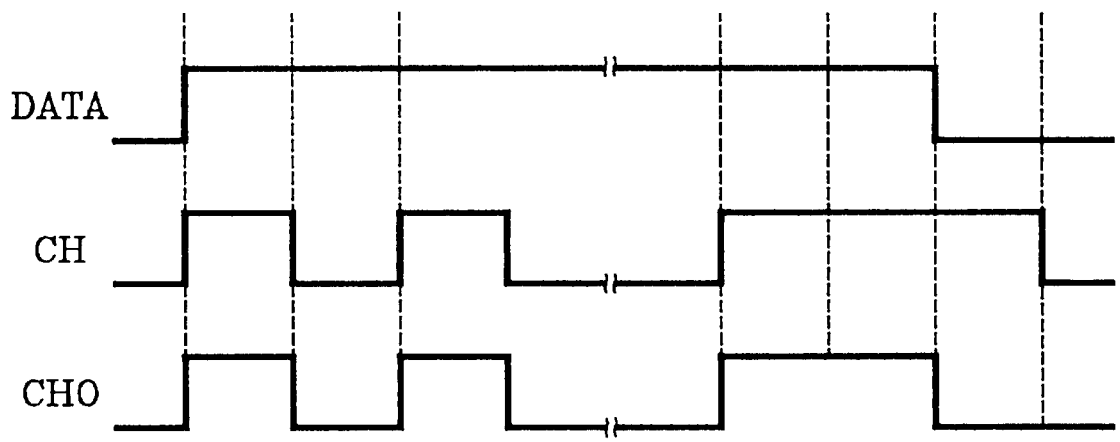
FIG. 2 is an illustration of a timing diagram for chopping a data signal in accordance with one embodiment of the present invention.

FIG. 2 shows an example of a timing diagram relating to the chopping operation performed by the video controller of the present embodiment. In particular, the input data signal DATA is chopped in accordance with the chopping control signal CH. As indicated above, each section of the data signal DATA may be chopped in accordance with the value of the bit located at a corresponding bit position in the chopping control register. Specifically, the value of the chopping control signal CH may relate to the value of the corresponding bit in the register.

The signal CH and the input data signal DATA are input to the AND gate 20, and an AND operation is performed on such signals CH and DATA. Thus, as shown in FIG. 2, the chopping output signal CHO is high when both signals DATA and CH are high, and the signal CHO is low when either the data signal DATA or the control signal CH is low.

Figure 3:
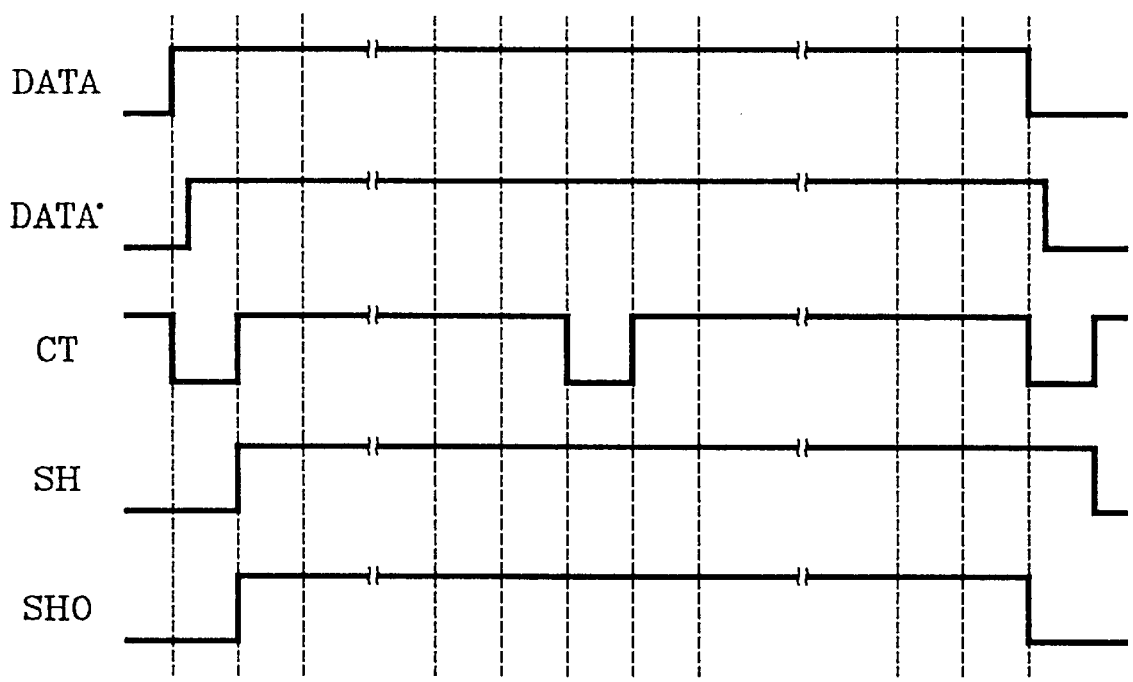
FIG. 3 is an illustration of a timing diagram for shrinking a data signal in accordance with one embodiment of the present invention.

FIG. 3 shows an example of a timing diagram relating to the shrinking operation performed by the video controller of the present embodiment. Specifically, the input data signal DATA is output to the delay 10 and delayed by a predetermined period of time to produce a delayed data signal DATA°.

The delayed data signal DATA° is then supplied to the tri-state buffer 40, and the buffer 40 outputs the signal DATA° as the shrinking control signal SH. For instance, as shown in FIG. 3, the buffer 40 outputs the signal DATA° as the control signal SH at the rising edge of the buffer control signal CT.

Furthermore, the buffer control signal CT may be generated in accordance with the values of the various bits stored in the shrinking control register. Moreover, the length of the pulse of the control signal CT corresponds to the degree to which the data signal DATA is shrunk. For instance, FIG. 3 shows the shrinking of one of the sections of the data signal DATA from among all of the sections.

The input data signal DATA and the shrinking control signal SH are supplied to the second AND gate 30, and the signal DATA is shrunk in accordance with the signal SH. In particular, the AND gate 30 performs an AND operation on such signals SH and DATA. Consequently, as shown in FIG. 3, the shrinking output signal SHO is high when both signals DATA and SH are high, and the signal SHO is low when either the data signal DATA or the control signal SH is low.

In addition, the input data signal DATA and the output data signal DOUT may be multiplexed such that either the unprocessed data signal DATA or the processed data signal DOUT may be output from the video controller. Furthermore, the video controller may also individually output the chopping output signal CHO and the shrinking output signal SHO. As a result, the video controller is capable of outputting a data signal which has undergone only a chopping operation or only a shrinking operation. Alternatively, the chopping output signal CHO and the shrinking output signal SHO may be synthesized into a synthesized signal, and the synthesized signal may be output from the video controller.

As described above, the chopping operation and the shrinking operation can be implemented and controlled by storing the appropriate values in one or more registers. Furthermore, the chopping operation and shrinking operation may be individually performed or may be performed simultaneously. Consequently, the video controller of the present invention is advantageous over conventional video controllers.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A video controller for controlling a manner in which input data is printed, comprising:

a first AND gate which inputs said input data and a chopping control signal and which outputs a chopping output signal based on said input data and said chopping control signal;

a buffer which inputs delayed input data and a buffer control signal, wherein said delayed input data corresponds to said input data which has be delayed for a predetermined period of time and wherein said buffer outputs said delayed input data as a shrinking control signal in accordance with said buffer control signal; and a second AND gate which inputs said shrinking control signal and said input data and which outputs a shrinking output signal based on said input data and said shrinking control signal.

2. A video controller as claimed in claim 1, further comprising:

a third AND gate which inputs said chopping output signal and said shrinking output signal and which outputs output data based on said chopping output signal and said shrinking output signal.

3. A video controller as claimed in claim 1, further comprising:

a bus holder for maintaining an output state of said buffer at an appropriate level.

4. A video controller as claimed in claim 1, further comprising:

first outputting means for simultaneously outputting said shrinking output signal and said chopping output signal.

5. A video controller as claimed in claim 1, further comprising:

first outputting means for selectively outputting one of said shrinking output signal and said chopping output signal.

6. A video controller as claimed in claim 4, further comprising:

second outputting means for selectively outputting one of said shrinking output signal and said chopping output signal.

7. A video controller as claimed in claim 6, further comprising:

activating means for selectively activating one of said first outputting means and said second outputting means.

8. A video controller for controlling a manner in which input data is printed, comprising:

chopping means for generating a chopping output signal, wherein said chopping means inputs said input data and a chopping control signal and outputs said chopping output signal based on said input data and said chopping control signal;

shrinking means for generating a shrinking output signal, wherein said shrinking means inputs said input data and a shrinking control signal and outputs said shrinking output signal based on said input data and said shrinking control signal; and shrinking control signal generating means for generating said shrinking control signal, wherein said shrinking control signal generating means inputs said input data and a generating control signal and outputs said shrinking control signal based on said input data and said generating control signal.

9. A video controller as claimed in claim 8, wherein said chopping means comprises:

a first AND gate which inputs said input data and said chopping control signal and outputs said chopping output signal.

10. A video controller as claimed in claim 8, wherein said shrinking means comprises:

a first AND gate which inputs said input data and said shrinking control signal and outputs said shrinking output signal.

11. A video controller as claimed in claim 8, wherein said shrinking control signal generating means comprises:

a delay which inputs said input data and delays said input data by a predetermined period of time to produce delayed input data; and a buffer which inputs said delayed input data and said generating control signal, wherein said buffer outputs said delayed input data as said shrinking control signal in accordance with said generating control signal.

12. A video controller as claimed in claim 9, wherein said shrinking means comprises:

a second AND gate which inputs said input data and said shrinking control signal and outputs said shrinking output signal, and wherein said shrinking control signal generating means comprises:

a delay which inputs said input data and delays said input data by a predetermined period of time to produce delayed input data; and a buffer which inputs said delayed input data and said generating control signal, wherein said buffer outputs said delayed input data as said shrinking control signal in accordance with said generating control signal.

13. A video controller as claimed in claim 1, further comprising:

a shrinking control register which stores shrinking control signal data, wherein said buffer control signal is generated in accordance with said shrinking control signal data; and a chopping control register which stores chopping control signal data, wherein said chopping control signal is generated in accordance with said chopping control signal data.

14. A video controller as claimed in claim 8, further comprising:

a shrinking control register which stores shrinking control signal data, wherein said generating control signal is generated in accordance with said shrinking control signal data; and a chopping control register which stores chopping control signal data, wherein said chopping control signal is generated in accordance with said chopping control signal data.

15. A method for controlling a manner in which input data is printed, comprising the steps of:

performing a chopping operation on said input data based on a chopping control signal;

generating a corresponding chopping output signal based on said chopping operation;

performing a shrinking operation on said input data based on a shrinking control signal;

generating a corresponding shrinking output signal based on said shrinking operation; and selectively outputting said chopping output signal and said shrinking output signal in a simultaneous mode and an individual mode, wherein said chopping output signal and said shrinking output signal are simultaneously output in said simultaneous mode, and wherein only one of said chopping output signal and said shrinking output signal is output at a particular time in said individual mode.

16. A method as claimed in claim 15, further comprising the steps of:

delaying said input data to produce delayed input data; and outputting said delayed input data in accordance with a generating control signal, wherein said delayed input data is output as said shrinking control signal.

17. A method as claimed in claim 16, further comprising the steps of:

storing shrinking control signal data in a shrinking control register;

generating said generating control signal in accordance with said shrinking control signal data;

storing chopping control signal data in a chopping control signal register; and generating said chopping control signal in accordance with said chopping control signal data.

18. A method as claimed in claim 15, wherein said step of performing a chopping operation comprises the steps of:

supplying said input data and said chopping control signal to a first AND gate; and performing a first AND operation on said input data and said chopping control signal.

19. A method as claimed in claim 18, wherein said step of performing a shrinking operation comprises the steps of:

supplying said input data and said shrinking control signal to a second AND gate; and performing a second AND operation on said input data and said shrinking control signal.

* * * * *